United States Patent
Dessendier et al.

(10) Patent No.: US 11,198,743 B2
(45) Date of Patent: Dec. 14, 2021

(54) METHOD FOR CONTINUOUS POLYMERIZATION OF MODIFIED DIENE ELASTOMER WITH LITHIUM AMIDE INITIATOR

(71) Applicant: COMPAGNIE GENERALE DES ETABLISSEMENTS MICHELIN, Clermont-Ferrand (FR)

(72) Inventors: Marie-Hélène Dessendier, Clermont-Ferrand (FR); Charlotte Dire, Clermont-Ferrand (FR); Claire Fauvarque-Nuytten, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 200 days.

(21) Appl. No.: 16/472,196

(22) PCT Filed: Dec. 20, 2017

(86) PCT No.: PCT/EP2017/083897
§ 371 (c)(1),
(2) Date: Jun. 20, 2019

(87) PCT Pub. No.: WO2018/115168
PCT Pub. Date: Jun. 28, 2018

(65) Prior Publication Data
US 2019/0352433 A1 Nov. 21, 2019

(30) Foreign Application Priority Data
Dec. 21, 2016 (FR) .................. 1663005

(51) Int. Cl.
| | |
|---|---|
| C08F 2/06 | (2006.01) |
| B01J 19/00 | (2006.01) |
| C08C 19/25 | (2006.01) |
| C08F 2/01 | (2006.01) |
| C08F 2/60 | (2006.01) |
| C08F 4/08 | (2006.01) |
| C08F 236/10 | (2006.01) |
| C08K 5/20 | (2006.01) |
| C08K 5/5419 | (2006.01) |

(52) U.S. Cl.
CPC ............ *C08F 2/06* (2013.01); *B01J 19/0066* (2013.01); *C08C 19/25* (2013.01); *C08F 2/01* (2013.01); *C08F 2/60* (2013.01); *C08F 4/086* (2013.01); *C08F 236/10* (2013.01); *C08K 5/20* (2013.01); *C08K 5/5419* (2013.01); *B01J 2219/0004* (2013.01); *B01J 2219/00033* (2013.01); *B01J 2219/00166* (2013.01)

(58) Field of Classification Search
USPC ...................... 526/65, 180; 525/53
See application file for complete search history.

(56) References Cited

U.S. PATENT DOCUMENTS

| | | | |
|---|---|---|---|
| 6,313,216 B1* | 11/2001 | Christian ............... | C08C 19/44 |
| | | | 524/575 |
| 2002/0120082 A1* | 8/2002 | Hsu ......................... | C08F 4/48 |
| | | | 526/180 |
| 2007/0219316 A1 | 9/2007 | Viola | |
| 2016/0060368 A1 | 3/2016 | Döring et al. | |
| 2019/0233547 A1* | 8/2019 | Mun ....................... | C08C 19/44 |

FOREIGN PATENT DOCUMENTS

| | | |
|---|---|---|
| EP | 0992537 A1 | 4/2000 |
| EP | 1829906 A1 | 9/2007 |
| WO | 0181430 A1 | 11/2001 |
| WO | 2009077837 A1 | 6/2009 |
| WO | 2014040640 A1 | 3/2014 |
| WO | 2016001372 A1 | 1/2016 |
| WO | 2017001637 A1 | 1/2017 |

OTHER PUBLICATIONS

Machine translation of Detailed Description of WO 2016/001372A1; retrieved from ESPACENET on Mar. 2, 2021. (Year: 2016).*
International Search Report for corresponding International Application No. PCT/EP2017/083897 dated Apr. 26, 2018.
Written Opinion for corresponding International Application No. PCT/EP2017/083897.

* cited by examiner

*Primary Examiner* — Fred M Teskin
(74) *Attorney, Agent, or Firm* — Dickinson Wright PLLC

(57) ABSTRACT

A process for the continuous synthesis of a modified diene elastomer comprising at least one silicon atom directly connected to the elastomer chain is provided. The process comprises polymerization by n reactors r1 to rn, considered to be continuous stirred-tank reactors equipped with an internal stirring system and arranged in series, n varying from 2 to 15. The reactor r1 is fed by an input solution comprising a solvent, one or more monomer(s), an anionic polymerization initiator chosen from lithium amides and a polar agent. The temperature of each reactor varies from 20° C. to 150° C. and is greater than or equal to the temperature of the reactor which immediately precedes it. The living diene elastomer obtained exhibits a polydispersity index varying from 1.1 to 1.7. The process further comprises modification of the living diene elastomer obtained in the preceding stage by a functionalization, coupling or star-branching agent.

19 Claims, No Drawings

METHOD FOR CONTINUOUS POLYMERIZATION OF MODIFIED DIENE ELASTOMER WITH LITHIUM AMIDE INITIATOR

This application is a 371 national phase entry of PCT/EP2017/083897 filed on 20 Dec. 2017, which claims benefit of French Patent Application No. 1663005, filed 21 Dec. 2016, the entire contents of which are incorporated herein by reference for all purposes.

BACKGROUND

1. Technical Field

The present invention relates to a process for the continuous synthesis, by means of several reactors in series, of a modified diene elastomer exhibiting a narrow molecular weight distribution, making it possible to obtain, in the case of an initiation with a lithium amide, a high content of functional groups in the elastomer other than those contributed by the initiator.

2. Related Art

Now that savings in fuel and the need to protect the environment have become a priority, it is desirable to produce polymers having good mechanical properties and a hysteresis which is as low as possible in order to be able to employ them in the form of rubber compositions which can be used in the manufacture of various semi-finished products involved in the composition of tire covers, such as, for example, underlayers, bonding rubbers between rubbers of different natures, coating rubbers for metal or textile reinforcing elements, sidewall rubbers or treads, and to obtain tires with improved properties, in particular having a reduced rolling resistance.

The reduction in the hysteresis of the mixtures is an ongoing objective of the tire industry in order to limit fuel consumption and to thus protect the environment. This must, however, be carried out while keeping intact the processability of the mixtures.

Many solutions have already been experimented with in order to achieve the objective of a fall in hysteresis. Mention may in particular be made of the modification of the structure of diene polymers and copolymers at the end of polymerization by means of functionalization agents, coupling agents or star-branching agents with the aim of obtaining a good interaction between the polymer, thus modified, and the filler, whether this is carbon black or a reinforcing inorganic filler. Mention may also be made of the use of a functional initiator having a functional group which interacts with the filler.

Mention may be made, by way of illustration of this prior art, of the use of diene elastomers functionalized by alkoxysilane compounds and amine compounds.

Mention may be made of Patent JP4655706B2, in which provision is made to combine the functionalization of the living chain end with a compound of the alkoxysilane type bearing an amine functional group with the initiating with an amine-functional alkyllithium with the aim of minimizing the hysteresis. In the same way, provision is made, in Patent Application US20120245275A1, to combine the functionalization of the living chain end with a compound of the alkoxysilane type bearing an amine functional group with the initiating with a lithium amide but also with a functional monomer of the vinylaminosilane type. Finally, in Patent Applications WO2015063161A1, WO2015044225A1, WO2015018772A1 and WO2015018600A1, provision is made to combine the initiating with a lithium amide with the reaction of the living chain end with compounds of the alkoxysilane type bearing different groups having an affinity for silica.

As illustrated above, the use of functional initiators having a group which interacts with silica, such as amine-functional alkyllithiums or lithium amides, is advantageous in reducing the rolling resistance while decreasing the dissipation of energy related to the free chain ends. It thus appears advantageous to be able to use them on the industrial scale in competitive processes for the synthesis of elastomers.

It is known to a person skilled in the art that continuous synthesis processes are more competitive than batchwise synthesis processes, for which frequent shutdowns and restart-ups are necessary. However, while the use of initiator of the lithium amide type results in high conversions of monomers (greater than 85%) and high contents (greater than or equal to 90%) of living polymer chains in the $C^-Li^+$ form being jointly obtained in the batchwise process, a high conversion of monomers (greater than 85%) is associated with a low content of living polymer chains and thus with a low content of functionalizable chains (less than 60%) and a high content of functionalizable polymer chains (greater than or equal to 90%) is associated with a low conversion of monomers (less than 70%) in the case of a conventional continuous process in a reactor.

The reduction in the distribution of the molecular weights before functionalization of the elastomer also makes it possible to improve the hysteresis/processing compromise of the material.

The synthesis of the elastomers with a process of batchwise type is preferable in this regard, since this type of process makes it possible to control the molecular distribution in order to obtain diene copolymers with a narrow molecular weight distribution before functionalization, unlike a continuous process, which provides a wide molecular weight distribution.

Mention may be made, by way of example, of U.S. Pat. No. 6,313,232, EP 1318172 and EP 1 829 906, which assert that products exhibiting a low polydispersity are favourable to a reduced hysteresis. Linear polymers with narrow molecular distributions exhibit in addition an improved processing.

U.S. Pat. No. 5,587,420 describes a method for the polymerization of diene monomers in solution in a hydrocarbon solvent using, as initiator, an organolithium compound, batchwise. An organotin compound is added during or at the end of the batch. This type of batchwise process is less productive and less economical than a continuous process. This is described in U.S. Pat. No. 6,313,232, which describes a continuous process with a first stage of polymerization in the presence of a tin-derived compound, followed by a stage of functionalization with the tin at the outlet of the reactor for production of a diene polymer with improved physical properties, including the reduction in the hysteresis. However, the polydispersity values of polymers synthesized with this method are not indicated.

Moreover, as explained above, in order for the polymer obtained to be able to be upgraded, the synthesis process must be competitive and economical. In this sense, a process of continuous type is preferable. However, this type of process with a reactor considered to be continuous stirred-tank reactor, does not make it possible to control the polydispersity index, like the processes of batchwise type.

Many patents describe the synthesis of functional elastomers in a continuous process. Mention may be made of Patent JP 1988-235305 (63-235305JP), which describes an economical continuous polymerization process where the polymer obtained has a broad molecular distribution.

Patent EP 1 829 906 describes a continuous process for the production of diene and vinylaromatic copolymers in the presence of a polarity-modifying agent (THFA-ethyl) in order to obtain a random incorporation of the monomers. The synthesis is carried out by means of at least two reactors in series. The copolymer obtained exhibits a polydispersity index of between 1.6 and 2.5.

Mention may also be made of U.S. Pat. No. 6,372,863 B1, which describes a continuous process for the polymerization of styrene and butadiene in two reactors in series, according to which all of the styrene is introduced into the first reactor with only a part of the butadiene, the remainder of the butadiene being introduced into the second reactor. This process makes it possible to synthesize random elastomers having a low vinyl content with an absence of styrene blocks.

SUMMARY

The aim of the invention is thus to identify a continuous synthesis process which makes it possible to jointly obtain a high conversion of monomers (greater than 70% by weight) and a high content of living polymer chains (greater than or equal to 90% by number) and thus a high content of functionalizable polymer chains on conclusion of the polymerization stage in the case of an initiation with a lithium amide. A high content of living polymer on conclusion of the polymerization stage is desirable in order to be able to functionalize, couple or star-branch, as desired, the polymer chains. The synthesis process should also make it possible to synthesize diene elastomers exhibiting a low molecular weight distribution before functionalization which makes possible a gain with regard to the hysteresis/processing compromise of the material thus synthesized.

The inventors have now discovered, surprisingly, that the aims of the invention could be obtained by a continuous synthesis process comprising several reactors in series, monomer, solvent or a polar agent optionally being reinjected into one or more of the reactors other than the first, the conversion by weight in the first reactor being less than 70%, the polymerization being continued in such a way that the total conversion by weight at the outlet of the final reactor is greater than 70%, the diene elastomer obtained exhibiting a polydispersity index varying from 1.1 to 1.7 and a low content of dead chains.

A subject matter of the invention is thus a process for the continuous synthesis of a modified diene elastomer comprising at least one silicon atom directly connected to the elastomer chain, comprising:

a) a stage of polymerization by means of n reactors r1 to rn, considered to be continuous stirred-tank reactors, which are equipped with an internal stirring system and which are arranged in series, n varying from 2 to 15, preferably from 2 to 9, the reactor r1 being fed by an input solution comprising a solvent, one or more monomer(s), an anionic polymerization initiator chosen from lithium amides and a polar agent, one or more of the reactors r2 to rn additionally being optionally fed by reinjection of a purified solution comprising solvent and/or monomer(s) and/or polar agent, the temperature of each reactor varying from 20° C. to 150° C., preferably varying from 30° C. to 120° C., and being greater than or equal to the temperature of the reactor which immediately precedes it, the temperature of the reactor rn being greater than the temperature of the reactor r1, the amount by weight $W_1$ of monomer(s) introduced into the reactor r1 being such that:

$$0.1 < \frac{W_1}{\sum_{j=1}^{n} W_j} \leq 1$$

the amount by weight $W_i$ of monomer(s) reinjected into the reactor ri, when $W_i \neq 0$, i varying from 2 to n, being such that:

$$0 < \frac{W_i}{\sum_{j=1}^{n} W_j} < 0.9$$

and such that $W_i$ represents from 5% to 100% by weight of the weight of the solution reinjected into the reactor ri, when $W_i \neq 0$, where $W_j$ is the amount by weight of monomer(s) introduced into the reactor rj, j varying from 1 to n, the amount by weight of all of the monomers entering the reactors r1 to rn representing from 5% to 25% by weight of the sum of the total inputs by weight of the reactors r1 to rn, the intrinsic conversion by weight $C_{intrinsic,1}$ in the first reactor being less than 70%, where $C_{intrinsic,1} = P_1/W_1$ where $P_1$ is the weight of polymer formed in the reactor r1, the total conversion by weight $C_{tot}$ at the outlet of the reactor rn being greater than or equal to 70%, where:

$$C_{tot} = \frac{\sum_{i=1}^{n} P_i}{\sum_{j=1}^{n} W_j}$$

where $P_i$ is the weight of polymer formed in the reactor ri, the overall conversion by weight $C_{overall\ i}$ in each reactor ri, i varying from 1 to n, being such that:

$$\frac{C_{tot}}{n} - 0.2 \times C_{tot} < C_{overall\ i} < \frac{C_{tot}}{n} + 0.2 \times C_{tot} \text{ and } C_{overall\ i} > 0$$

where:

$$C_{overall\ i} = \frac{P_i}{\sum_{j=1}^{n} W_j}$$

where $P_i$ is the weight of polymer formed in the reactor ri, i varying from 1 to n, the diene elastomer obtained exhibiting a polydispersity index varying from 1.1 to 1.7, preferably varying from 1.2 to 1.6, b) a stage of modification of the living diene elastomer obtained in the preceding stage by means of a functionalization, coupling or star-branching agent, which makes it possible to introduce, into the elastomer, a functional group comprising at least one silicon atom directly connected to the elastomer chain.

DETAILED DESCRIPTION OF EXAMPLE EMBODIMENTS

In the context of the present patent application, the term "reinjection" refers to the repeating of the action of injection into a reactor ri', other than the reactor r1, already fed by the stream from ri'−1. The reinjection, when it takes place, can be carried out directly into one or more of the reactors or, advantageously, by mixing with the stream resulting from ri'−1. The reinjection can be carried out with streams having a composition identical to or different from the r1 feed stream. When the reinjection takes place in at least two reactors, the natures of these reinjections can be identical or different. The term "reinjected monomer" refers to the monomer injected into ri' not resulting from the stream originating from ri'−1.

Thus, the term "amount by weight $W_i$ of monomer(s) introduced into the reactor ri" is understood to mean, when i=1, the amount of monomer(s) present in the input solution and introduced as such into the reactor 1 and, when i=2 to n, the amount of monomer(s) optionally reinjected into the reactor i.

By control of the conversion in each reactor and by the number of reactors, the continuous process according to the invention makes it possible to obtain, at the outlet of the final reactor, a content of living and thus functionalizable chains of greater than or equal to 90% by number, with respect to the total number of living chains initiated by a lithium amide in the reactor r1. However, the reinjected solution or solutions have to be purified in order not to degrade the living polymer.

In the case of an anionic polymerization, the living chain is a carbanion. The carbanion is a very reactive entity. It reacts with protic entities or electrophilic entities.

Thus, if the feedstock of the first reactor contains protic impurities (alcohols, water, acids, and the like) or electrophilic impurities (carbonyls, and the like), the initiator will react first with these impurities to lead to inactive entities (alkoxides) incapable of initiating the polymerization of the monomers. The difference between the amount of initiator introduced at the inlet of the reactor r1 and the amount of initiator which has reacted with the impurities in the reactor r1 constitutes the amount of active initiator. The number of living chains initiated in the reactor r1 is equivalent to this amount of active initiator in the reactor r1.

On the other hand, for the subsequent optional reinjection(s) between the reactors, the neutralization of the impurities introduced by the reinjection will be carried out by the polymer carbanion. This neutralization prevents the polymer chain from propagating and the chain thus becomes dead, that is to say inactive, towards the polymerization but also the functionalization. This entity is no longer reactive with the optional stopping, functionalization, coupling or star-branching agents.

This is why, apart from the feedstock of the first reactor, it is necessary to control the purity of each reinjected solution in order to guarantee the lowest possible dead-polymer content at the outlet of the reactor rn, i.e. less than 10% by number, with respect to the total number of chains initiated in the reactor r1.

The term "amount by weight of all of the monomer(s) entering the reactors r1 to rn" is understood to mean the sum of the amount by weight of monomer(s) introduced into the reactor r1 by the input solution and of the amounts by weight of the monomer(s) optionally reinjected into one or more of the reactors r2 to rn.

The term "sum of the total inputs by weight of the reactors r1 to rn" is understood to mean the sum of the amount by weight of the input solution and of the amounts by weight of the solutions optionally reinjected.

The term "polydispersity index" is understood to mean the ratio of the weight-average molecular weight to the number-average molecular weight. The weight-average and number-average molecular weights are measured by size exclusion chromatography.

The process according to the invention also makes it possible to control the polydispersity index of the polymer synthesized by the control of the conversion, by the balancing of the temperatures in each reactor and by the number of reactors.

The control of the conversion in all the reactors, in particular in the first and the final reactor, is provided by the temperature, the residence time, the amount of polar agent and the amount of monomer entering these reactors, the concentration of living polymer. A person skilled in the art knows how to vary these different parameters in order to control the conversions in the different reactors.

By operating at increasing temperature, the propagation in the reactors is accelerated. This is why, preferably, the temperature in at least one reactor ri is greater than the temperature of the reactor ri−1; preferably, the temperature of each reactor ri is greater than the temperature of the reactor ri−1, i varying from 2 to n.

The optional reinjection of a portion of the monomers into one or more of the reactors starting from the second has an impact on the amount of monomers present in the reactor and the residence time within the said reactor. Thus, these reinjections, which constitute an advantageous implementation of the process of the invention, also contribute to the balancing of the conversions and, as explained above, to the control of the polydispersity index.

Advantageously, the very high purity of the monomers reinjected makes it possible to reduce the impact of the side reactions which have a tendency to widen the molecular distribution of the polymer formed.

The residence times and the temperatures are also chosen in order not to promote these side reactions.

Preferably, the reactors are equipped with an internal stirring mechanism.

Preferably, the intrinsic conversion by weight $C_{intrinsic,1}$ in the reactor r1 is less than 65%, preferably less than 60%.

Preferably, the total conversion by weight $C_{tot}$ at the outlet of the reactor rn is greater than or equal to 80%, preferably greater than or equal to 85%.

Preferably, the number of reactors is equal to 2 or 3, preferably 2.

When the number of reactors is equal to 2, the process according to the invention preferably exhibits at least one of the following characteristics and more preferably all of the following characteristics:

- a reinjection of a solution comprising monomer(s) is carried out in the reactor r2,
- the purity of the solution optionally reinjected into the reactor r2 is such that the proportion of the number of dead chains in the output stream from the reactor r2 is less than 5% of the number of living chains initiated in the reactor r1,
- the temperature of the reactors r1 and r2 varies from 20° C. to 150° C., preferably from 30° C. to 120° C., the temperature of the reactor r2 being greater than the temperature of the reactor r1,
- the amount by weight of monomer(s) introduced into the reactor r1 is greater than 10% and less than 100% of the total amount by weight of the monomers introduced into the reactors r1 and r2, when a reinjection is carried out in r2, the amount by weight of monomer(s) reinjected into the reactor r2 is less than 90% by weight of the total weight of monomer(s) injected into the reactor r1 and reinjected into the reactor r2, when a reinjection is carried out in r2, the amount by weight of all of the monomers entering the reactors r1 to rn represents from 5% to 25% by weight of the sum of the inputs by weight of the reactors r1 and r2, when a reinjection is carried out in r2, the intrinsic conversion by weight in the reactor 1 is preferably less than 65%, more preferably less than 60%.

Preferably, the residence time in the reactor ri is between 1 and 60 minutes, preferably between 5 and 60 minutes, more preferably between 10 and 50 minutes. It is calculated in the following way:

$$\tau_i = \frac{V_i}{Q_{V_i}}$$

with:

$V_i$, volume of the reactor i varying from 1 to n $Q_{Vi}$=flow rate by volume exiting the reactor i.

As explained above, a solution comprising solvent and/or monomer(s) and/or polar agent is optionally reinjected into one or more of the reactors r2 to rn.

As explained above, the purity of each reinjected solution has to be controlled.

The term "purity of a reinjected solution" is understood to mean the proportion by weight of optional monomer(s), and of optional solvent and of optional polar agent, with respect to the total weight of the reinjected solution.

The purification stage consists in removing, from the reinjected solution, the protic compounds (water, alcohol, acids, and the like) and electrophilic compounds (carbonyl, and the like) which can deactivate the living chain end, so as to reduce their amount in this reinjected solution to a content of less than or equal to 5 mol % of the active initiator, preferably of less than or equal to 2 mol % of the active initiator. Each reinjected solution contains purified solvent and/or purified monomers and/or purified polar agent.

The constituent or each constituent of the reinjected solution(s) can be, before reinjection, purified independently by any purification means normally used to purify the constituents, for example by adsorption, liquid/liquid extraction, gas/liquid extraction or distillation.

In particular, the solvent and/or the monomer(s) and/or the polar agent can be independently purified by adsorption, liquid/liquid extraction, gas/liquid extraction or distillation.

Alternatively, the solution(s) to be reinjected, comprising all or part of the combination of its constituents, can, before reinjection, be purified by any purification means normally used to purify the constituents, for example by adsorption, liquid/liquid extraction, gas/liquid extraction or distillation.

The adsorption can be carried out on zeolite or on alumina.

The liquid/liquid extraction can be carried out by means of sodium hydroxide.

The gas/liquid extraction can be carried out by means of a stream of air or nitrogen.

The distillation can be a single-stage distillation without reflux (or flash distillation) or a column distillation, optionally under vacuum.

The flash distillation is carried out by means of an evaporation compartment. The column distillation is carried out by means of a distillation column.

Whatever the purification process chosen for each constituent or for the solution to be reinjected, the purified phase is used to constitute the stream to be reinjected.

According to one embodiment, the residues from the process(es) for the purification of the or each constituent or of the solution(s) to be reinjected are reinjected into the input solution feeding the first reactor. These residues consist of the monomers and/or of the solvent with a high concentration of impurities. The residues can then either constitute an extra contribution of monomer and/or of solvent and/or of polar agent to the input solution, or can constitute the sole source of monomer and/or of solvent and/or of polar agent of the input solution. This embodiment makes it possible to limit the loss of material in the case of reinjection.

The term "diene elastomer" should be understood, in a known way, as meaning an (one or more is understood) elastomer resulting at least in part (i.e., a homopolymer or a copolymer) from diene monomers (monomers bearing two conjugated or non-conjugated carbon-carbon double bonds). More particularly, the term "diene elastomer" is understood to mean any homopolymer obtained by polymerization of a conjugated diene monomer having from 4 to 12 carbon atoms or any copolymer obtained by copolymerization of one or more conjugated dienes with one another or with one or more vinylaromatic monomers having from 8 to 20 carbon atoms. In the case of copolymers, the latter contain from 20% to 99% by weight of diene units and from 1% to 80% by weight of vinylaromatic units.

The following in particular are suitable as conjugated dienes which can be used in the process in accordance with the invention: 1,3-butadiene, 2-methyl-1,3-butadiene, 2,3-di ($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene and 2,4-hexadiene, and the like.

The following in particular are suitable as vinylaromatic monomers: styrene, ortho-, meta- or para-methylstyrene, the "vinyltoluene" commercial mixture, para-(tert-butyl)styrene, methoxystyrenes, vinylmesitylene, divinylbenzene and vinylnaphthalene, and the like.

The diene elastomer is preferably selected from the group of highly unsaturated diene elastomers consisting of polybutadienes (BRs), synthetic polyisoprenes (IRs), butadiene copolymers, in particular copolymers of butadiene and of a vinylaromatic monomer, isoprene copolymers and the mixtures of these elastomers. Such copolymers are more particularly butadiene/styrene copolymers (SBRs), isoprene/butadiene copolymers (BIRs), isoprene/styrene copolymers (SIRs) and isoprene/butadiene/styrene copolymers (SBIRs). Among these copolymers, butadiene/styrene copolymers (SBRs) are particularly preferred.

The diene elastomer is prepared by anionic polymerization in the presence of a lithium amide polymerization initiator included in the input solution.

The lithium amides are the products of the reaction of an organolithium compound, preferably an alkyllithium compound, and of a non-cyclic or cyclic, preferably cyclic, secondary amine.

Mention may be made, as secondary amine which can be used to prepare the initiators, of dimethylamine, diethylamine, dipropylamine, di(n-butyl)amine, di(sec-butyl)amine, dipentylamine, dihexylamine, di(n-octyl)amine, di(2-ethylhexyl)amine, dicyclohexylamine, N-methylbenzylamine, diallylamine, morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5.5]undecane, 3-azabicyclo[3.2.2]nonane, carbazole, bistrimethylsilylamine, pyrrolidine and hexamethyleneamine.

The secondary amine, when it is cyclic, is preferably chosen from pyrrolidine and hexamethyleneamine.

The alkyllithium compound is preferably ethyllithium, n-butyllithium (n-BuLi), isobutyllithium, and the like.

The polymerization is carried out in the presence of a solvent included in the input solution.

The solvent used in the process according to the invention is preferably an inert hydrocarbon solvent which can, for example, be an aliphatic or alicyclic hydrocarbon, such as pentane, hexane, heptane, isooctane, cyclohexane or methylcyclohexane, or an aromatic hydrocarbon, such as benzene, toluene or xylene.

As explained above, the input solution, and also optionally one or more of the reinjected solutions, used in the process according to the invention comprise(s) a polar agent.

Suitable in particular as chelating polar agents which can be used in the process in accordance with the invention are the agents comprising at least one tertiary amine functional group or at least one ether functional group and preferably agents of tetrahydrofurfuryl ethyl ether or tetramethylethylenediamine type.

According to the invention, the living diene elastomer included in the output stream from the polymerization reactor m is subsequently reacted with at least one functionalization, coupling or star-branching agent, which makes it possible to introduce, into the elastomer, a functional group comprising at least one silicon atom directly connected to the elastomer chain.

Suitable as silicon-based functionalization, coupling or star-branching agent are the functionalization agents of cyclic polysiloxane type, provided that the reaction medium does not make possible the polymerization of the cyclopolysiloxane. Mention may be made, as cyclic polysiloxanes, of those corresponding to the formula (I):

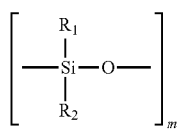

Formula (I)

with m represents an integer with a value ranging from 3 to 8, preferably 3, and $R_1$ and $R_2$, which are identical or different, represent an alkyl radical of 1 to 10 carbon atoms, preferably an alkyl radical having from 1 to 4 carbon atoms. Mention may be made, among these compounds, of hexamethylcyclotrisiloxane.

Also suitable as silicon-based functionalization, coupling or star-branching agent are the compounds corresponding to the formula (II):

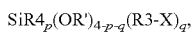

Formula (II)

in which:
R3 is a saturated or unsaturated, cyclic or non-cyclic, divalent $C_1$-$C_{18}$ aliphatic hydrocarbon radical or divalent $C_6$-$C_{18}$ aromatic hydrocarbon radical, preferably a linear or branched, divalent aliphatic hydrocarbon radical, more preferably a linear divalent aliphatic hydrocarbon radical and more preferably still the linear $C_2$ or $C_3$ hydrocarbon radical;

X is a hydrogen atom or a functional group capable of interacting with a reinforcing filler;

the R' radicals, which are substituted or unsubstituted and identical or different, represent a $C_1$-$C_{10}$, indeed even $C_1$-$C_8$, alkyl group, preferably a $C_1$-$C_4$ alkyl group, more preferably methyl and ethyl;

the R4 radicals, which are substituted or unsubstituted and identical or different, represent a $C_1$-$C_{10}$ alkyl group, indeed even a $C_1$-$C_8$ alkyl group;

p represents an integer with a value ranging from 0 to 2 and q represents an integer with the value 0 or 1, with the proviso that p+q≤2.

The various preferred or nonpreferred aspects which precede relating to the formula (II) can be combined with one another.

According to alternative forms of the invention, the functionalization agent of formula (II) does not comprise another functional group than that comprising the silicon atom of alkoxysilane type. It is then a tetraalkoxysilane, a monoalkyltrialkoxysilane or a dialkyldialkoxysilane.

According to other alternative forms of the invention, the functionalization agent of formula (II) comprises a functional group other than the functional group comprising the silicon atom, in particular capable of interacting with a reinforcing filler. This designation, however, does not exclude the possibility for the functional group comprising the silicon atom to also interact with a reinforcing filler.

The term "functional group capable of interacting with a reinforcing filler" is preferably understood to mean functional groups comprising at least one heteroatom chosen from N, S, O or P. Mention may be made, by way of example, among these functional groups, of protected or unprotected primary amines, protected or unprotected secondary amines or tertiary amines which are cyclic or non-cyclic, isocyanates, imines, cyanos, the protected or unprotected thiol functional group, carboxylates, epoxides or protected or unprotected primary phosphines, protected or unprotected secondary phosphines or tertiary phosphines.

Thus, according to alternative forms of the invention, the functional group capable of interacting with a reinforcing filler is a protected or unprotected primary amine, a protected or unprotected secondary amine or a tertiary amine. The nitrogen atom can then be substituted by two identical or different groups which can be a trialkylsilyl radical, the alkyl group having from 1 to 4 carbon atoms, or a $C_1$-$C_{10}$, preferably $C_1$-$C_4$, alkyl radical, more preferably a methyl or ethyl radical, or else the two substituents of the nitrogen form, with the latter, a heterocycle comprising a nitrogen atom and at least one carbon atom, preferably from 2 to 6 carbon atoms.

Mention may be made, for example, as functionalization agent, the functional group capable of interacting with a reinforcing filler of which is an amine, of (N,N-dialkylaminopropyl)trialkoxysilanes, (N,N-dialkylaminopropyl)alkyldialkoxysilanes, (N-alkylaminopropyl)trialkoxysilanes and (N-alkylaminopropyl)alkyldialkoxysilanes, the secondary amine functional group of which is protected by a trialkylsilyl group, and aminopropyltrialkoxysilanes and aminopropylalkyldialkoxysilanes, the primary amine functional group of which is protected by two trialkylsilyl groups. The alkyl substituents present on the nitrogen atom are linear or branched and advantageously have from 1 to 10 carbon atoms, preferably from 1 to 4, more preferably 1 or 2. For example, the methylamino-, dimethylamino-, ethylamino-, diethylamino-, propylamino-, dipropylamino-, butylamino-, dibutylamino-, pentylamino-, dipentylamino-, hexylamino-, dihexylamino- or hexamethyleneimino- groups, preferably the diethylamino- and dimethylamino- groups, are suitable as alkyl substituents. The alkoxy substituents are linear or branched and generally have from 1 to 10 carbon atoms, indeed even from 1 to 8, preferably from 1 to 4 and more preferably 1 or 2.

Preferably, the functionalization agent can be chosen from (3-N,N-dialkylaminopropyl)trialkoxysilanes and (3-N,N-dialkylaminopropyl)alkyldialkoxysilanes, the alkyl group on the silicon atom being the methyl or ethyl group and the alkoxy group being the methoxy or ethoxy group.

Preferably, the functionalization agent can be chosen from (3-N,N-alkyltrimethylsilylaminopropyl)trialkoxysilanes and (3-N,N-alkyltrimethylsilylaminopropyl)alkyldialkoxysilanes, the alkyl group on the silicon atom being the methyl or ethyl group and the alkoxy group being the methoxy or ethoxy group.

Preferably, the functionalization agent can be chosen from (3-N,N-bistrimethylsilylaminopropyl)trialkoxysilanes and (3-N,N-bistrimethylsilylaminopropyl)alkyldialkoxysilanes, the alkyl group on the silicon atom being the methyl or ethyl group and the alkoxy group being the methoxy or ethoxy group.

According to alternative forms of the invention, the functional group capable of interacting with a reinforcing filler is an isocyanate functional group. Preferably, the functionalization agent can be chosen from (3-isocyanatopropyl)trialkoxysilanes and (3-isocyanatopropyl)alkyldialkoxysilanes, the alkyl group being the methyl or ethyl group and the alkoxy group being the methoxy or ethoxy group.

According to alternative forms of the invention, the functional group capable of interacting with a reinforcing filler is an imine functional group. Preferably, the functionalization agent can be chosen from N-(1,3-dimethylbutylidene)-3-(trimethoxysilyl)-1-propanamine, N-(1,3-dimethylbutylidene)-3-(triethoxysilyl)-1-propanamine, N-(1,3-methylethydene)-3-(trimethoxysilyl)-1-propanamine, N-(1, 3-methylethylidene)-3-(triethoxysilyl)-1-propanamine, N-ethylidene-3-(trimethoxysilyl)-1-propanamine, N-ethylidene-3-(triethoxysilyl)-1-propanamine, N-(1-methylpropylidene)-3-(trimethoxysilyl)-1-propanamine, N-(1-methylpropylene)-3-(triethoxysilyl)-1-propanamine, N-(4-N,N-dimethylaminobenzylidene)-3-(trimethoxysilyl)-1-propanamine, N-(4-N,N-dimethylaminobenzylidene)-3-(triethoxysilyl)-1-propanamine, N-(cyclohexylidene)-3-(trimethoxysilyl)-1-propanamine, N-(cyclohexylidene)-3-(triethoxysilyl)-1-propanamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole and N-(3-triethoxysilylpropyl)-4,5-imidazole.

According to alternative forms of the invention, the functional group capable of interacting with a reinforcing filler is an cyano functional group. Preferably, the functionalization agent can be chosen from (3-cyanopropyl)trialkoxysilanes and (3-cyanopropyl)alkyldialkoxysilanes, the alkyl group being the methyl or ethyl group and the alkoxy group being the methoxy or ethoxy group.

According to alternative forms of the invention, the functional group capable of interacting with a reinforcing filler is a protected or unprotected thiol functional group. Mention may be made, by way of example, of (S-trialkylsilylmercaptopropyl)trialkoxysilanes, (S-trialkylsilylmercaptopropyl)alkyldialkoxysilanes, (S-trialkylsilylmercaptoethyl)trialkoxysilanes and (S-trialkylsilylmercaptoethyl) alkyldialkoxysilanes, the alkyl group on the silicon atom bearing the alkoxysilane groups being the methyl or ethyl group and the alkoxy group being the methoxy or ethoxy group. The alkyl group on the silicon bonded to the sulfur atom is the methyl or tert-butyl group.

According to alternative forms of the invention, the functional group capable of interacting with a reinforcing filler is a carboxylate functional group. Mention may be made, as carboxylate functional group, of acrylates or methacrylates. Such a functional group is preferably a methacrylate. Preferably, the functionalization agent can be chosen from (3-methacryloyloxypropyl)trialkoxysilanes and (3-methacryloyloxypropyl)alkyldialkoxysilanes, the alkyl group being the methyl or ethyl group and the alkoxy group being the methoxy or ethoxy group.

According to alternative forms of the invention, the functional group capable of interacting with a reinforcing filler is an epoxide functional group. Preferably, the functionalization agent can be chosen from (3-glycidyloxypropyl)trialkoxysilanes and (3-glycidyloxypropyl)alkyldialkoxysilanes, the alkyl group being the methyl or ethyl group and the alkoxy group being the methoxy or ethoxy group.

According to alternative forms of the invention, the functional group capable of interacting with a reinforcing filler is a protected or unprotected primary phosphine functional group, a protected or unprotected secondary phosphine functional group or a tertiary phosphine functional group. Preferably, the functionalization agent can be chosen from (3-P,P-bistrimethylsilylphosphinopropyl)trialkoxysilanes, (3-P,P-bistrimethylsilylphosphinopropyl)alkyldialkoxysilanes, (3-P,P-alkyltrimethylsilylphosphinopropyl)trialkoxysilanes, (3-P,P-alkyltrimethylsilylphosphinopropyl)alkyldialkoxysilanes, (3-P,P-dialkylphosphinopropyl)trialkoxysilanes and (3-P,P-dialkylphosphinopropyl)alkyldialkoxysilanes, the alkyl group on the phosphorus atom being the methyl, ethyl or phenyl group, the alkyl group on the silicon atom being the methyl or ethyl group and the alkoxy group being the methoxy or ethoxy group.

The different preferred or nonpreferred aspects which precede and which relate to the functionalization agent of formula (II), in particular as regards the nature of the other functional group capable of interacting with the reinforcing filler, the nature of the spacer group R3 and the nature of the alkoxysilane group, can be combined with one another. According to the process of the invention, it is possible to use a single silicon-based functionalization, coupling or star-branching agent or a mixture of at least two of these agents.

The silicon-based functionalization, coupling or star-branching agent is advantageously in solution in a solvent compatible with that included in the stream resulting from the polymerization reactor rn and feeding the functionalization device. The term "compatible solvent" is understood to mean, generally, solvent miscible with the polymerization solvent. Preferably, this solvent is identical to the polymerization solvent.

The silicon-based functionalization, coupling or star-branching agent is added in proportions such that the molar ratio of this silicon-based functionalization, coupling or star-branching agent to the polymerization initiator depends essentially on the type of modified diene elastomer desired and on the number of sites of the functionalization, coupling or star-branching agent which are reactive with regard to the living elastomer. The term "reactive sites" is understood to mean essentially, in the context of the invention, Si—O bonds in the formula (I) or Si—OR bonds in the formula (II).

Thus, with a ratio ranging from 0.40 to 0.75, preferably from 0.45 to 0.65 and more preferably still from 0.45 to 0.55, the formation of coupled entities within the modified elastomer is favoured if the agent of formula (II) has at least two sites which are reactive with regard to the living elastomer. In the same way, with a ratio ranging from 0.15 to 0.40, preferably from 0.20 to 0.35, star-branched entities (3 and/or 4 branches) are predominantly formed within the modified elastomer if the agent of formula (II) has at least three sites which are reactive with regard to the living elastomer. With a ratio greater than or equal to 0.75, preferably greater than 1, entities functionalized at the chain end are predominantly formed if the agent has at least one site which is reactive with regard to the living elastomer. With an excess of agent of formula (II), in particular with a molar ratio of this functionalization agent to the initiator of at least 2, the contents of entities other than the entities functionalized at the chain end are negligible.

It is clear to a person skilled in the art that the functionalization agents of formula (I) make it possible to modify the elastomer only at the chain end and do not make possible coupling and star-branching. The molar ratio of this silicon-based functionalization agent to the polymerization initiator defines only the proportions of chains functionalized at the chain end and of non-functional chains in the modified elastomer.

The silicon-based functionalization, coupling or star-branching agent is advantageously continuously injected in homogeneous manner into a functionalization device fed at the inlet of the device by the output stream from the polymerization reactor rn comprising the living diene elastomer bearing an active site. The term "functionalization device" is understood to mean one or more reactors in series. These reactors can be of identical or different nature, in particular tubular, tubular with axial dispersion, stirred considered to be continuous stirred-tank reactors. The continuous injection of at least one functionalization, coupling or star-branching agent is carried out in at least one of these reactors.

The residence time in each tubular reactor, or tubular reactor having axial dispersion, is preferably between 0 and 120 minutes, in particular between 0.1 and 60 minutes, more preferably between 0.1 and 5 minutes.

The residence time in each stirred reactor or reactor, considered to be continuous stirred-tank reactor, is preferably between 0 and 60 minutes, more preferably between 5 and 50 minutes.

The functionalization temperature generally varies from 30° C. to 150° C. Preferably, the functionalization temperature is equal to the temperature within the polymerization reactor which immediately precedes the functionalization device.

When the silicon-based functionalization, coupling or star-branching agent is in accordance with the formula (II), a particularly advantageous implementation of the invention consists in using a device for the functionalization of the living diene elastomer in accordance with that described in Applications FR 3 009 556 A1, the content of which should be regarded as forming part of the present patent application.

It is thus possible to proceed competitively, economically and flexibly, in a way adaptable to industrial production, to the synthesis of modified diene elastomers with mastery of the distribution of the functional entities (functionalized at the chain end and/or coupled and/or star-branched) within the elastomer.

The functionalization device of this advantageous implementation of the invention, when the silicon-based functionalization, coupling or star-branching agent is in accordance with the formula (II), can have, for model, one of the following models:
  a tubular reactor with axial dispersion, or alternatively
  a tubular reactor with axial dispersion in series with at least one stirred continuous reactor, considered to be continuous stirred-tank reactor, or alternatively
  at least one tubular reactor with axial dispersion in series with a stirred continuous reactor, considered to be continuous stirred-tank reactor, or alternatively
  several tubular reactors with axial dispersion in series with several stirred continuous reactors, considered to be continuous stirred-tank reactors, or alternatively
  at least two stirred continuous reactors, considered to be continuous stirred-tank reactors, in series.

According to a specific embodiment, the living diene elastomer included in the output stream from the polymerization reactor rn can be reacted with at least two silicon-based functionalization, coupling or star-branching agents, more particularly at least two different agents in accordance with the formula (II). Mention may be made, for example, of the combination of a trialkoxysilane and of an alkyldialkoxysilane, each bearing a functional group capable of interacting with a reinforcing filler which is preferably identical, this functional group being advantageously chosen from protected or unprotected primary amines, protected or unprotected secondary amines or tertiary amines which are cyclic or non-cyclic, the protected or unprotected thiol functional group.

According to another specific embodiment, which can optionally be combined with the preceding embodiment, the living diene elastomer included in the output stream from the polymerization reactor rn can be reacted, in addition, with a silicon-based or tin-based coupling or star-branching agent. Mention may be made, among these, of the tin or silicon derivatives of formula $MR_xY_{4-x}$, M represents a Sn or Si atom, x represents an integer with a value from 0 to 2, preferably with a value from 0 to 1, R represents an alkyl radical of 1 to 10 carbon atoms, preferably an alkyl radical having from 1 to 4 carbon atoms, and Y is a halogen atom, preferably chlorine. Mention may be made, as examples, of compounds such as tin tetrachloride, methyltin trichloride, dimethyltin dichloride, tetrachlorosilane, methyltrichlorosilane and dimethyldichlorosilane.

The reaction with this complementary coupling or star-branching agent can take place in a way known per se.

According to the invention, the preferred aspects of this specific embodiment of the process for the synthesis of the modified diene elastomer can be combined with the different preferred or non-preferred aspects of the other embodiments or alternative embodiments of the process which it complements.

The process for the synthesis of the modified diene elastomer according to the invention can be continued in a way known per se.

According to alternative forms of the invention, the process can comprise a conventional stage of halting by means, for example, of methanol or water.

According to the alternative forms of the invention according to which the functionalization agent bears a protected primary or secondary amine functional group, the synthesis process can be continued by a stage of deprotection of the primary or secondary amine. This stage is carried out after the modification reaction. The chains functionalized by the protected amine group can, by way of example, be reacted with an acid, a base, a fluorinated derivative, such as tetrabutylammonium fluoride, a silver salt, such as silver nitrate, and the like, in order to deprotect this amine functional group. These different methods are described in the work "Protective Groups in Organic Synthesis", T. W. Green and P. G. M. Wuts, Third Edition, 1999. This deprotection stage can have the effect of hydrolysing all or a portion of the hydrolysable alkoxysilane functional groups of the modified diene elastomer in order to convert them into silanol functional groups.

According to the alternative forms of the invention according to which the functionalization agent bears a protected thiol functional group, the synthesis process can be continued by a stage of deprotection of the thiol. This stage is carried out after the modification reaction. The chains functionalized by the protected thiol group can, by way of example, be reacted with water, an alcohol or an acid (hydrochloric acid, sulfuric acid, carboxylic acid). This deprotection stage can have the effect of hydrolysing all or a portion of the hydrolysable alkoxysilane functional groups of the modified diene elastomer in order to convert them into silanol functional groups.

According to the alternative forms of the invention according to which the functionalization agent bears a protected primary or secondary phosphine functional group, the synthesis process can be continued by a stage of deprotection of the phosphine. This stage is carried out after the modification reaction. The chains functionalized by the protected phosphine group can, by way of example, be reacted with water, an alcohol or an acid (hydrochloric acid, sulfuric acid, carboxylic acid). This deprotection stage can have the effect of hydrolysing all or a portion of the hydrolysable alkoxysilane functional groups of the modified diene elastomer in order to convert them into silanol functional groups.

According to alternative forms of the invention, the synthesis process can comprise a stage of hydrolysis of the hydrolysable alkoxysilane functional groups by addition of an acidic, basic or neutral compound, as described in the document EP 2 266 819 A1. The hydrolysable functional groups are then converted into silanol functional groups.

According to alternative forms of the invention, the synthesis process with a functionalization agent of formula (I) can comprise a stage of reaction with a proton-donating compound in order to result in the diene polymer silanol-functionalized at the chain end.

The process for the synthesis of the modified diene elastomer according to the invention can be continued in a way known per se by the stages of recovery of the modified elastomer.

According to alternative forms of this process, these stages comprise a stripping stage for the purpose of recovering the elastomer resulting from the prior stages in dry form. This stripping stage can have the effect of hydrolysing all or a portion of the hydrolysable functional groups of the modified diene elastomer, in particular the hydrolysable alkoxysilane functional groups, converting them into silanol functional groups. At least 50 mol % to 70 mol % of the hydrolysable functional groups can thus be hydrolysed.

The modified diene elastomers according to the process of the invention can advantageously be used in rubber compositions as a mixture with one or more other compounds. As a result of the high content of functional groups, whether they result from the polymerization initiator or from the post-polymerization modification, the diene elastomers thus modified are particularly indicated for optimizing the interactions between the elastomer and the reinforcing filler within a reinforced rubber composition, whatever the nature of the reinforcing filler.

The abovementioned characteristics of the present invention, and also others, will be better understood on reading the following description of several implementational examples of the invention, given by way of illustration and without limitation.

Measurements and Tests Used

Conversion

The conversions are measured by weighing the solids content of the solution containing the polymer. In this method, solution containing the polymer is withdrawn at the outlet of the reactor. This solution is introduced into a pre-tared tray. The mass of solution is thus weighed.

The sample is dried under a reduced pressure of 200 mmHg at 140° C. for 15 minutes. The tray is subsequently placed in a desiccator containing silica gel for 2 minutes. Weighing the tray then makes it possible to determine the weight of polymer of the withdrawn sample.

The different conversions are then worked back to in the following way:

$$C_{intrinsic\ 1} = \frac{w(\text{solids content})1}{w(\text{sample})1} \times \frac{Q_1}{W_1}$$

with:
$W_1$ the flow rate by weight of monomers introduced into the reactor 1,
$Q_1$ the sum of all the flow rates by weight of the entities entering the reactor 1, $$C_{solids\ content\ i} = \frac{w(\text{solids content})i}{w(\text{sample})i} \times \frac{Q_i}{\sum_{j=1}^{i} W_j}$$

with:
$Q_i$ the sum of all the flow rates by weight of the entities entering the reactor i, $$C_{overall\ i} = C_{solids\ conent\ i} \times \frac{\sum_{j=1}^{i} W_j}{\sum_{k=1}^{n} W_k} - C_{overall\ i-1}$$

$$C_{total} = \sum_{i=1}^{n} C_{overall\ i}$$

Microstructure of the Elastomers

The microstructure of the elastomers is characterized by the near-infrared (NIR) spectroscopy technique.

Near-infrared spectroscopy (NIR) is used to quantitatively determine the content by weight of styrene in the elastomer and also its microstructure (relative distribution of the 1,2-, trans-1,4- and cis-1,4-butadiene units). The principle of the method is based on the Beer-Lambert law generalized for a multicomponent system. As the method is indirect, it involves a multivariate calibration [Vilmin, F., Dussap, C.

and Coste, N., Applied Spectroscopy, 2006, 60, 619-29] carried out using standard elastomers having a composition determined by $^{13}$C NMR. The styrene content and the microstructure are then calculated from the NIR spectrum of an elastomer film having a thickness of approximately 730 µm. The spectrum is acquired in transmission mode between 4000 and 6200 cm$^{-1}$ with a resolution of 2 cm$^{-1}$ using a Bruker Tensor 37 Fourier-transform near-infrared spectrometer equipped with an InGaAs detector cooled by the Peltier effect.

Number-Average Molar Mass and Polydispersity Index

The number-average molar mass and the polydispersity index of the polymer are determined using SEC (size exclusion chromatography).

The SEC (Size Exclusion Chromatography) technique makes it possible to separate macromolecules in solution according to their size through columns filled with a porous gel. The macromolecules are separated according to their hydrodynamic volume, the bulkiest being eluted first.

SEC makes it possible to comprehend the average molar masses and the distributions of the molar masses of a polymer. The various number-average molar masses ($M_n$) and weight-average molar masses ($M_w$) can be determined from commercial standards and the polydispersity index ($PI=M_w/M_n$) can be calculated via a "Moore" calibration.

There is no specific treatment of the polymer sample before analysis. The latter is simply dissolved in the elution solvent at a concentration of approximately 1 g·l$^{-1}$. The solution is then filtered through a filter with a porosity of 0.45 µm before injection.

The apparatus used is a Waters Alliance chromatographic line. The elution solvent is either tetrahydrofuran or tetrahydrofuran+1 vol % of diisopropylamine+1 vol % of triethylamine, the flow rate is 1 ml·min$^{-1}$, the temperature of the system is 35° C. and the analytical time is 30 min. A set of two Waters columns with the Styragel HT6E trade name is used. The volume of the solution of the polymer sample injected is 100 µl. The detector is a Waters 2410 differential refractometer and the software for making use of the chromatographic data is the Waters Empower system.

The calculated average molar masses are relative to a calibration curve produced for SBRs having the following microstructure: 28% by weight of units of styrene type, 18% by weight of units of 1,2-type, 31% by weight of units of trans-1,4-type and 23% by weight of units of cis-1,4-type.

Content of Chains $(CH_3)_2SiOH$-Functionalized at the Chain End

The content of chains $(CH_3)_2SiOH$-functionalized at the chain end is determined by NMR analysis.

2D $^1H$-$^{29}Si$ NMR makes it possible to confirm the nature of the functional group by virtue of the chemical shift values of the silicon nuclei and of the protons in the $^2J$ vicinity (via 2 bonds). It uses a $^2J^1H$-$^{29}Si$ coupling constant value of 8 Hz. The chemical shift of the silicon of the SBR$(CH_3)_2SiOH$ entity at the chain end is approximately 11-12 ppm.

$^1H$ NMR makes it possible to quantify the methyl groups borne by the silicon (SiCH$_3$) by integration of the corresponding signal, located around $\delta$=0 ppm. The samples are dissolved in carbon disulfide (CS$_2$). 100 µl of deuterated cyclohexane (C$_6$D$_{12}$) are added for the lock signal. The NMR analyses are carried out on a Bruker 500 MHz spectrometer equipped with a 5 mm BBIz "broad band" probe. For the quantitative $^1H$ NMR experiment, the sequence uses a 30° pulse and a repetition time of 2 seconds.

Thus, knowing the total amount of chains by the $M_n$ value obtained by SEC analysis, it is possible to determine the content of chains $(CH_3)_2SiOH$-functionalized at the chain end.

In addition to the content of functionalized chains, this content also makes it possible to determine the content of dead chains in the diene elastomer at the outlet of the reactor rn, which is the complement to 100 of the content of functionalized chains.

Content of chains functionalized at the chain end with the compound (3-N,N-dimethylaminopropyl)trimethoxysilane (DMAPTMS)

The content of chains functionalized at the chain end with the compound (3-N,N-dimethylaminopropyl)trimethoxysilane (DMAPTMS) is determined by NMR analysis.

The spectra are acquired on a Bruker Avance III HD 500 MHz spectrometer equipped with a mm BBI Z-grad "broad band" cryoprobe. The quantitative $^1H$ NMR experiment uses a simple 30° pulse sequence and a repetition time of 5 seconds between each acquisition. 64 to 256 accumulations are carried out.

Two-dimensional and $^1H/^{29}Si$ experiments are used with the aim of determining the structure of the functional polymers.

The samples are dissolved in carbon disulfide (CS$_2$). 100 µl of deuterated cyclohexane are added to the solution for the lock.

The final chemical structure of the functional polymer is identified by $^1H$, $^{13}C$ and $^{29}Si$ NMR.

The 1D $^1H$ NMR spectrum recorded under quantitative conditions makes it possible to calculate the content of (3-N,N-dimethylaminopropyl)trimethoxysilane grafted to the polymer. The signals characteristic of the grafted functional group are observable at $^1H$ chemical shifts located between 3.25 ppm and 3.40 ppm for the methoxy group (Si—OCH$_3$) and 0.58 ppm to 0.35 ppm for the methylene unit in the a position with regard to the silicon (Si—CH$_2$—R). The content of functional group is quantified from the integration of the NMR signals of the methylene protons in the a position with regard to the silicon.

The position of the functional group on the polymer is confirmed by a two-dimensional $^1H/^{29}Si$ correlation chart. The $^{29}Si$ NMR signals of the (3-N,N-dimethylaminopropyl) trimethoxysilane grafted at the end of the polymer chain correspond to a broad unresolved peak, the chemical shift of which is between 10 ppm and 8 ppm. The $^{29}Si$ NMR signals of the (3-N,N-dimethylaminopropyl)trimethoxysilane grafted to the middle of the polymer chain correspond to a broad unresolved peak, the chemical shift of which is between 10 ppm and 9 ppm.

Thus, knowing the total amount of chains by the $M_n$ value obtained by SEC analysis, it is possible to determine the content of chains (3-N,N-dimethylaminopropyl)trimethoxysilane-functionalized at the chain end.

In addition to the content of functionalized chains, this content also makes it possible to determine the content of dead chains in the diene elastomer at the outlet of the reactor rn, which is the complement to 100 of the content of functionalized chains.

Content of HMN-Initiated Chains

The content of HMN-initiated chains is determined by NMR analysis.

The samples (approximately 200 mg) are dissolved in approximately 1 ml of carbon disulfide (CS$_2$). 100 µl of deuterated cyclohexane are added to the solution for the lock of the spectrometer.

The spectra are acquired on a Bruker Avance 500 MHz spectrometer equipped with a BBI Z-grad "broad band" 5 mm cryoprobe.

The quantitative $^1$H NMR experiment uses a simple 30° pulse sequence and a repetition time of 5 seconds between each acquisition. 64 to 1024 accumulations are carried out. Two-dimensional $^1$H/$^{13}$C experiments were carried out in order to determine the structure of the functional polymers. The proton chemical shifts are calibrated with respect to the protonated impurity of the $CS_2$ at 7.18 ppm.

In the case of a butadiene homopolymer, or a polybutadiene, the quantitative simple pulse 1D $^1$H NMR measurement makes it possible to observe two broad unresolved peaks (2.8 ppm to 3.0 ppm and 2.3 ppm to 2.5 ppm) respectively corresponding to the protons 1 and 2.

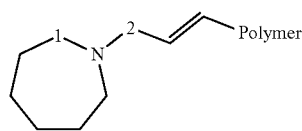

The integration of the protons 2 makes it possible to estimate the amount of HMN units grafted to a 1,4-butadiene and the integration of the protons 1 makes it possible to estimate the total amount of HMN units grafted to the polybutadiene chains.

In the case of a copolymer of butadiene and of styrene, the quantitative simple pulse 1D $^1$H NMR measurement makes it possible to observe a single broad unresolved peak (2.8 ppm to 3.0 ppm) corresponding to the protons 2. The integration of the protons 2 makes it possible to estimate the amount of HMN units grafted to a 1,4-butadiene only. The signal of the protons 1 is masked by the aliphatic signal of the SBR matrix. In the case of an SBR, only the amount of HMN units grafted to a 1,4-butadiene can thus be estimated.

Thus, knowing the total amount of chains by the $M_n$ value obtained by SEC analysis, it is possible to determine the content of HMN-initiated chains (only the HMN units bonded to a 1,4-butadiene unit are quantifiable in the case of copolymers of butadiene and of styrene).

Examples of Preparation of Elastomers

Methylcyclohexane, butadiene, styrene and tetrahydrofurfuryl ethyl ether are continuously introduced, according to the proportions described in each example, into a pilot-scale continuous polymerization plant containing one or more stirred continuous reactors, considered to be continuous stirred-tank reactors according to a person skilled in the art. n-Butyllithium is introduced in a sufficient amount in order to neutralize the protic impurities introduced by the different constituents present in the line input and then lithiated hexamethyleneimine is introduced in order to initiate the polymer chains. Lithiated hexamethyleneimine is synthesized in situ continuously by reaction of one equivalent of hexamethyleneimine and 1.02 equivalents of butyllithium in a reactor, considered to be continuous stirred-tank reactor.

For Examples D and E, a purification of the reinjected butadiene solution is carried out continuously by means of a column of aluminas. This column is packed with a fixed bed of aluminas of Axsorb 920 type.

The minimum L/D ratio of the fixed bed is 4.

The minimum column diameter/mean alumina particle diameter ratio is 10.

The empty-tank Reynolds number is greater than 2.

The minimum residence time of the fluid in the full column is 5 minutes.

The column is maintained under the following conditions:

Temperature=10° C.

Pressure=5 bar.

For Examples A, B, C and D, a sample is withdrawn at the outlet of the reactor rn in order to determine the polydispersity index of the polymer before modification. The withdrawn sample of living polymer is stopped by introduction of methanol in a large molar excess with respect to the initiator. The polydispersity index is then measured by size exclusion chromatography.

Furthermore, at the outlet of the reactor m, the living elastomer stream is continuously introduced into a tubular reactor having axial dispersion continuously supplied with an excess of hexamethylcyclotrisiloxane in cyclohexane in order to functionalize the living polymer.

For Examples E and F, a sample is withdrawn at the outlet of the reactor rn in order to determine the polydispersity index of the polymer before modification. The withdrawn sample of living polymer is stopped by introduction of methanol in a large molar excess with respect to the initiator. The polydispersity index is then measured by size exclusion chromatography.

Furthermore, at the outlet of the reactor m, the living elastomer stream is continuously introduced into a tubular reactor having axial dispersion continuously supplied with an excess of (3-N,N-dimethylaminopropyl)trimethoxysilane in solution in methylcyclohexane (n(DMAPTMS)/n(living polymer) molar ratio=2) in order to functionalize the elastomer at the chain end.

The residence times and the concentrations indicated in the examples are calculated from the flow rates of the different constituents entering the polymerization process.

Example a—Comparative—Continuous Process with 1 Reactor and Functionalization of the Chains with Hexamethylcyclotrisiloxane A synthesis of butadiene/styrene polymer is carried out according to a comparative process using 1 single stirred reactor, considered to be continuous stirred-tank reactor.

The operating conditions are specified in Table 1.

TABLE 1

| Operating conditions | Value | Unit | Reactor |
|---|---|---|---|
| Number of reactors | 1 | — | — |
| Volume of the reactors | 14 | l | 1 |
| % Styrene (1) | 33 | % | 1 |
| % Monomers by weight (2) | 12 | % | 1 |
| Polar agent (tetrahydrofurfuryl ethyl ether) | $3.51 \times 10^{-4}$ | mol/l | 1 |
| Active initiator (lithiated hexamethyleneimine) | $6.45 \times 10^{-4}$ | mol/l | 1 |
| Residence time | 30 | min | 1 |
| Temperature | 90 | ° C. | 1 |
| Conversion by weight (3) | 85 | % | 1 |

(1) by weight, with respect to the sum of all the inputs by weight of monomers of the process
(2) by weight, with respect to the sum of all the inputs by weight of the process
(3) conversion by weight of monomers in the reactor The characteristics of the polymer obtained at the outlet of the reactor are given in Table 2.

TABLE 2

| | |
|---|---|
| Vinyl content (4) | 25.5 % |
| Styrene content (5) | 28 % |
| Tg | −45 °C. |
| PI | 2.0 — |
| $M_n$ | 124.1 kg/mol |
| Amount of HMN functional groups | 6.0 mmol/kg |
| Content of HMN-initiated chains (6) | 81 % |
| Amount of $(CH_3)_2SiOH$ functional groups | 4.0 mmol/kg |
| Content of $(CH_3)_2SiOH$-functionalized chains (7) | 50 % |

(4) by weight, with respect to the butadiene units present in the polymer chains
(5) by weight, with respect to the butadiene and styrene units
(6) molar ratio of the amount of HMN functional groups, determined by NMR, to the number of chain ends, calculated from the $M_n$ value measured on the elastomer recovered on conclusion of the stage of functionalization with hexamethylcyclotrisiloxane.
(7) molar ratio of the amount of $(CH_3)_2SiOH$ functional groups, determined by NMR, to the number of chain ends, calculated from the $M_n$ value measured on the elastomer recovered on conclusion of the stage of functionalization with hexamethylcyclotrisiloxane.

Example B—According to the Invention—2 Reactors in Series without Reinjection

A synthesis of styrene/butadiene polymer is carried out according to a process according to the invention using 2 stirred reactors, considered to be continuous stirred-tank reactors, in series.

The operating conditions are specified in Table 3.

TABLE 3

| Operating conditions | Value | Unit | Reactor |
|---|---|---|---|
| Number of reactors | 2 | — | — |
| Volume of the reactors | 14 | l | 1 |
| | 14 | | 2 |
| % Styrene (1) | 35 | % | 1 |
| % Monomers by weight (2) | 12 | % | 1 |
| Polar agent (tetrahydrofurfuryl ethyl ether) | $1.1 \times 10^{-4}$ | mol/l | — |
| Active initiator (lithiated hexamethyleneimine) | $5.54 \times 10^{-4}$ | mol/l | 1 |
| Residence time | 30 | min | 1 |
| | 30 | min | 2 |
| Temperature | 62 | °C. | 1 |
| | 80 | | 2 |
| Overall conversion by weight | 59 | % | 1 |
| | 31 | % | 2 |
| Intrinsic conversion by weight | 59 | % | 1 |
| Total conversion by weight | 90 | % | 2 |

(1) by weight, with respect to the sum of all the inputs by weight of monomers of the process
(2) by weight, with respect to the sum of all the inputs by weight of the process The characteristics of the polymer obtained at the outlet of the reactor 2 are given in Table 4.

TABLE 4

| | |
|---|---|
| Vinyl content (3) | 25 % |
| Styrene content (4) | 29 % |
| Tg | −45 °C. |
| $M_n$ | 152.2 kg/mol |
| PI | 1.7 — |
| Amount of HMN functional groups | 5.0 mmol/kg |
| Content of HMN-initiated chains (5) | 76 % |
| Amount of $(CH_3)_2SiOH$ functional groups | 6.0 mmol/kg |
| Content of $(CH_3)_2SiOH$-functionalized chains (6) | 92 % |

(3) by weight, with respect to the butadiene units present in the polymer chains
(4) by weight, with respect to the butadiene and styrene units
(5) molar ratio of the amount of HMN functional groups, determined by NMR, to the number of chain ends, calculated from the $M_n$ value measured on the elastomer recovered on conclusion of the stage of functionalization with hexamethylcyclotrisiloxane.
(6) molar ratio of the amount of $(CH_3)_2SiOH$ functional groups, determined by NMR, to the number of chain ends, calculated from the $M_n$ value measured on the elastomer recovered on conclusion of the stage of functionalization with hexamethylcyclotrisiloxane.

Thus, this example shows that it is possible to concomitantly obtain, with the continuous process according to the invention, a high conversion, a high content of living polymer and thus a high content of functionalized chains, and a narrow distribution of the molar masses.

Example C—Comparative—2 Reactors in Series with Unpurified Reinjection

A synthesis of styrene/butadiene polymer is carried out according to a process according to the invention using 2 stirred reactors, considered to be continuous stirred-tank reactors, in series.

The reinjected butadiene is not purified. The operating conditions are specified in Table 5.

TABLE 5

| Operating conditions | Value | Unit | Reactor |
|---|---|---|---|
| Number of reactors | 2 | — | — |
| Volume of the reactors | 14 | l | 1 |
| | 14 | | 2 |
| % Styrene (1) | 35 | % | 1 |
| % Monomers by weight (2) | 12 | % | 1 |
| Polar agent (tetrahydrofurfuryl ethyl ether) | $1.2 \times 10^{-4}$ | mol/l | — |
| Active initiator (lithiated hexamethyleneimine) | $5.76 \times 10^{-4}$ | mol/l | 1 |
| Residence time | 30 | min | 1 |
| | 30 | min | 2 |
| Temperature | 62 | °C. | 1 |
| | 80 | °C. | 2 |
| Butadiene reinjection (3) | 30 | % | 2 |
| Overall conversion by weight | 50 | % | 1 |
| | 43 | % | 2 |
| Intrinsic conversion by weight | 62 | % | 1 |
| Total conversion | 93 | % | 2 |

(1) by weight, with respect to the sum of all the inputs by weight of monomers of the process
(2) by weight, with respect to the sum of all the inputs by weight of the process
(3) by weight, with respect to the total weight of the monomers injected into all of the reactors The characteristics of the polymer obtained at the outlet of the reactor 2 are given in Table 6.

TABLE 6

| | |
|---|---|
| Vinyl content (4) | 25 % |
| Styrene content (5) | 28.5 % |
| Tg | −45.5 °C. |
| $M_n$ | 147.0 kg/mol |
| PI | 1.6 — |
| Amount of HMN functional groups | 5.2 mmol/kg |
| Content of HMN-initiated chains (6) | 76 % |
| Amount of $(CH_3)_2SiOH$ functional groups | 5.7 mmol/kg |
| Content of $(CH_3)_2SiOH$-functionalized chains (7) | 84 % |

(4) by weight, with respect to the butadiene units present in the polymer chains
(5) by weight, with respect to the butadiene and styrene units
(6) molar ratio of the amount of HMN functional groups, determined by NMR, to the number of chain ends, calculated from the $M_n$ value measured on the elastomer recovered on conclusion of the stage of functionalization with hexamethylcyclotrisiloxane.
(7) molar ratio of the amount of $(CH_3)_2SiOH$ functional groups, determined by NMR, to the number of chain ends, calculated from the $M_n$ value measured on the elastomer recovered on conclusion of the stage of functionalization with hexamethylcyclotrisiloxane.

Thus, this example shows that, if the reinjection solution is not purified, then it is not possible to obtain the targeted content of living polymer and thus a high content of functionalized chains.

Example D—According to the Invention—2 Reactors in Series with Purified Reinjection A synthesis of styrene/butadiene polymer is carried out according to a process according to the invention using 2 stirred reactors, considered to be continuous stirred-tank reactors, in series.

The reinjected butadiene is purified by an alumina column. The operating conditions are specified in Table 7.

TABLE 7

| Operating conditions | Value | Unit | Reactor |
| --- | --- | --- | --- |
| Number of reactors | 2 | — | — |
| Volume of the reactors | 14 | l | 1 |
|  | 14 |  | 2 |
| % Styrene (1) | 35 | % | 1 |
| % Monomers by weight (2) | 12 | % | 1 |
| Polar agent (tetrahydrofurfuryl ethyl ether) | $1.2 \times 10^{-4}$ | mol/l | — |
| Active initiator (lithiated hexamethyleneimine) | $5.76 \times 10^{-4}$ | mol/l | 1 |
| Residence time | 30 | min | 1 |
|  | 30 | min | 2 |
| Temperature | 62 | ° C. | 1 |
|  | 80 | ° C. | 2 |
| Butadiene reinjection (3) | 30 | % | 2 |
| Overall conversion by weight | 50 | % | 1 |
|  | 42 | % | 2 |
| Intrinsic conversion by weight | 62 | % | 1 |
| Total conversion by weight | 92 | % | 2 |

(1) by weight, with respect to the sum of all the inputs by weight of monomers of the process
(2) by weight, with respect to the sum of all the inputs by weight of the process
(3) by weight, with respect to the total weight of the monomers injected into all of the reactors The characteristics of the polymer obtained at the outlet of the reactor 2 are given in Table 8.

TABLE 8

| | |
| --- | --- |
| Vinyl content (4) | 25 % |
| Styrene content (5) | 28.5 % |
| Tg | −45.5 ° C. |
| $M_n$ | 147.0 kg/mol |
| PI | 1.6 — |
| Amount of HMN functional groups | 5.2 mmol/kg |
| Content of HMN-initiated chains (6) | 76 % |
| Amount of $(CH_3)_2SiOH$ functional groups | 6.5 mmol/kg |
| Content of $(CH_3)_2SiOH$-functionalized chains (7) | 95 % |

(4) by weight, with respect to the butadiene units present in the polymer chains
(5) by weight, with respect to the butadiene and styrene units
(6) molar ratio of the amount of HMN functional groups, determined by NMR, to the number of chain ends, calculated from the $M_n$ value measured on the elastomer recovered on conclusion of the stage of functionalization with hexamethylcyclotrisiloxane.
(7) molar ratio of the amount of $(CH_3)_2SiOH$ functional groups, determined by NMR, to the number of chain ends, calculated from the $M_n$ value measured on the elastomer recovered on conclusion of the stage of functionalization with hexamethylcyclotrisiloxane.

Thus, this example shows that it is possible to concomitantly obtain, with the continuous process according to the invention, a high conversion, a high content of living polymer and thus a high content of functionalized chains, and a narrow distribution of the molar masses.

Example E—According to the Invention—2 Reactors in Series with Purified Reinjection A synthesis of styrene/butadiene polymer is carried out according to a process according to the invention using 2 stirred reactors, considered to be continuous stirred-tank reactors, in series.

The reinjected butadiene is purified by an alumina column. The operating conditions are specified in Table 9.

TABLE 9

| Operating conditions | Value | Unit | Reactor |
| --- | --- | --- | --- |
| Number of reactors | 2 | — | — |
| Volume of the reactors | 14 | l | 1 |
|  | 14 |  | 2 |
| % Styrene (1) | 35 | % | 1 |
| % Monomers by weight (2) | 12 | % | 1 |
| Polar agent (tetrahydrofurfuryl ethyl ether) | $1.2 \times 10^{-4}$ | mol/l | — |
| Active initiator (lithiated hexamethyleneimine) | $5.76 \times 10^{-4}$ | mol/l | 1 |
| Residence time | 30 | min | 1 |
|  | 30 | min | 2 |
| Temperature | 62 | ° C. | 1 |
|  | 80 | ° C. | 2 |
| Butadiene reinjection (3) | 30 | % | 2 |
| Overall conversion by weight | 50 | % | 1 |
|  | 42 | % | 2 |
| Intrinsic conversion by weight | 62 | % | 1 |
| Total conversion by weight | 92 | % | 2 |

(1) by weight, with respect to the sum of all the inputs by weight of monomers of the process
(2) by weight, with respect to the sum of all the inputs by weight of the process
(3) by weight, with respect to the total weight of the monomers injected into all of the reactors The characteristics of the polymer obtained at the outlet of the reactor 2 are given in Table 10.

TABLE 10

| | |
| --- | --- |
| Vinyl content (4) | 25 % |
| Styrene content (5) | 28.5 % |
| Tg | −45.5 ° C. |
| $M_n$ | 145.0 kg/mol |
| PI | 1.6 — |
| Amount of HMN functional groups | 5.0 mmol/kg |
| Content of HMN-initiated chains (6) | 73 % |
| Amount of DMAPTMS functional groups | 6.5 mmol/kg |
| Content of DMAPTMS-functionalized chains (7) | 93 % |

(4) by weight, with respect to the butadiene units present in the polymer chains
(5) by weight, with respect to the butadiene and styrene units
(6) molar ratio of the amount of HMN functional groups, determined by NMR, to the number of chain ends, calculated from the $M_n$ value measured on the elastomer recovered on conclusion of the stage of functionalization with DMAPTMS.
(7) molar ratio of the amount of DMAPTMS functional groups, determined by NMR, to the number of chain ends, calculated from the $M_n$ value measured on the elastomer recovered on conclusion of the stage of functionalization with DMAPTMS.

Thus, this example shows that it is possible to concomitantly obtain, with the continuous process according to the invention, a high conversion, a high content of living polymer and thus a high content of functionalized chains, and a narrow distribution of the molar masses.

Example F—According to the Invention—3 Reactors in Series with a Temperature Gradient and without Reinjection of Butadiene A synthesis of butadiene/styrene polymer is carried out according to a process according to the invention using 3 stirred reactors, considered to be continuous stirred-tank reactors, in series.

The operating conditions are specified in Table 11.

TABLE 11

| Operating conditions | Value | Unit | Reactor |
| --- | --- | --- | --- |
| Number of reactors | 3 | — | — |
| Volume of the reactors | 14 | l | 1 |
|  | 14 |  | 2 |
|  | 14 |  | 3 |
| % Styrene (1) | 28 | % | 1 |
| % Monomers by weight (2) | 12 | % | 1 |

TABLE 11-continued

| Operating conditions | Value | Unit | Reactor |
|---|---|---|---|
| Polar agent (tetrahydrofurfuryl ethyl ether) | 8.8 × 10⁻⁵ | mol/l | — |
| Active initiator (lithiated hexamethyleneimine) | 5.86 × 10⁻⁴ | mol/l | 1 |
| Residence time | 30 | min | 1 |
|  | 30 | min | 2 |
|  | 30 | min | 3 |
| Temperature | 50 | ° C. | 1 |
|  | 70 | ° C. | 2 |
|  | 80 | ° C. | 3 |
| Overall conversion by weight | 40 | % | 1 |
|  | 30 | % | 2 |
|  | 23 | % | 3 |
| Total conversion by weight | 93 | % | 3 |
| Intrinsic conversion by weight | 40 | % | 1 |

(1) by weight, with respect to the sum of all the inputs by weight of monomers of the process
(2) by weight, with respect to the sum of all the inputs by weight of the process The characteristics of the polymer obtained at the outlet of the reactor 3 are given in Table 12.

TABLE 12

| Vinyl content (3) | 25.5 | % |
|---|---|---|
| Styrene content (4) | 27.5 | % |
| Tg | −46 | ° C. |
| PI | 1.45 | — |
| $M_n$ | 145.8 | kg/mol |
| Amount of HMN functional groups | 5.2 | mmol/kg |
| Content of HMN-initiated chains (5) | 76 | % |
| Amount of DMAPTMS functional groups | 6.6 | mmol/kg |
| Content of DMAPTMS-functionalized chains (6) | 96 | % |

(3) by weight, with respect to the butadiene units present in the polymer chains
(4) by weight, with respect to the butadiene and styrene units
(5) molar ratio of the amount of HMN functional groups, determined by NMR, to the number of chain ends, calculated from the Mn value measured on the elastomer recovered on conclusion of the stage of functionalization with DMAPTMS.
(6) molar ratio of the amount of DMAPTMS functional groups, determined by NMR, to the number of chain ends, calculated from the Mn value measured on the elastomer recovered on conclusion of the stage of functionalization with DMAPTMS.

Thus, this example shows that it is possible to concomitantly obtain, with the continuous process according to the invention, a high conversion, a high content of living polymer and thus a high content of functionalized chains, and a narrow distribution of the molar masses.

The invention claimed is:

1. A process for the continuous synthesis of a modified diene elastomer comprising at least one silicon atom directly connected to the elastomer chain, comprising:
   a) a stage of polymerization by means of n reactors r1 to rn, considered to be continuous stirred-tank reactors, which are equipped with an internal stirring system, and which are arranged in series, n varying from 2 to 15,
   the reactor r1 being fed by an input solution comprising a solvent, one or more monomer(s), an anionic polymerization initiator chosen from lithium amides and a polar agent,
   one or more of the reactors r2 to rn additionally being optionally fed by reinjection of a purified solution comprising solvent and/or monomer(s) and/or polar agent,
   the temperature of each reactor varying from 20° C. to 150° C. and being greater than or equal to the temperature of the reactor which immediately precedes it, the temperature of the reactor rn being greater than the temperature of the reactor r1,
   the amount by weight $W_1$ of monomer(s) introduced into the reactor r1 being such that:

$$0.1 < \frac{W_1}{\sum_{j=1}^{n} W_j} \leq 1$$

the amount by weight $W_i$ of monomer(s) reinjected into the reactor ri, when $W_i \neq 0$, i varying from 2 to n, being such that:

$$0 < \frac{W_i}{\sum_{j=1}^{n} W_j} < 0.9$$

and such that $W_i$ represents from 5% to 100% by weight of the weight of the solution reinjected into the reactor ri, when $W_i \neq 0$,
where $W_j$ is the amount by weight of monomer(s) introduced into the reactor rj, j varying from 1 to n,
the amount by weight of all of the monomers entering the reactors r1 to rn representing from 5% to 25% by weight of the sum of the total inputs by weight of the reactors r1 to rn,
the intrinsic conversion by weight $C_{intrinsic,1}$ in the first reactor being less than 70%,
where $C_{intrinsic,1} = P_1/W_1$
where $P_1$ is the weight of polymer formed in the reactor r1,
the total conversion by weight $C_{tot}$ at the outlet of the reactor rn being greater than or equal to 70%,
where:

$$C_{tot} = \frac{\sum_{i=1}^{n} P_i}{\sum_{j=1}^{n} W_j}$$

where $P_i$ is the weight of polymer formed in the reactor ri, the overall conversion by weight $C_{overall\ i}$ in each reactor ri, with i varying from 1 to n, being such that:

$$\frac{C_{tot}}{n} - 0.2 \times C_{tot} < C_{overall\ i} < \frac{C_{tot}}{n} + 0.2 \times C_{tot} \text{ and } C_{overall\ i} > 0$$

where:

$$C_{overall\ i} = \frac{P_i}{\sum_{j=1}^{n} W_j}$$

where $P_i$ is the weight of polymer formed in the reactor ri, i varying from 1 to n,
the living diene elastomer obtained exhibiting a polydispersity index varying from 1.1 to 1.7,
   b) a stage of modification of the living diene elastomer obtained in the preceding stage (a) by means of a functionalization, coupling or star-branching agent, which makes it possible to introduce, into the elastomer, a functional group comprising at least one silicon atom directly connected to the elastomer chain.

2. A process according to claim 1, wherein the temperature in at least one reactor ri is greater than the temperature of the reactor ri−1, i varying from 2 to n.

3. A process according to claim 1, wherein n varies from 2 to 3.

4. A process according to claim 1, wherein the intrinsic conversion by weight $C_{intrinsic\ 1}$ in the reactor r1 is less than 65%.

5. A process according to claim 1, wherein the total conversion by weight $C_{tot}$ at the outlet of the reactor rn is greater than or equal to 80%.

6. A process according claim 1, wherein one or more of the reactor(s) r2 to rn is additionally fed by reinjection of a purified solution comprising solvent and/or monomer(s) and/or polar agent.

7. A process according to claim 1, wherein the solution(s) to be reinjected or independently the or each constituent of the reinjected solution(s) is/are, before reinjection, purified by adsorption, liquid/liquid extraction, gas/liquid extraction, or distillation.

8. A process according to claim 7, wherein the residues from the process(es) for the purification of the or each constituent or of the solution(s) to be reinjected are reinjected into the input solution feeding the first reactor.

9. A process according to claim 8, wherein the residues from the process(es) for the purification of the or each constituent or of the solution(s) to be reinjected constitute an extra contribution of monomer and/or of solvent and/or of polar agent to the input solution.

10. A process according to claim 8, wherein the residues from the process(es) for the purification of the or each constituent or of the solution(s) to be reinjected constitute the sole source of monomer and/or of solvent and/or of polar agent of the input solution.

11. A process according to claim 1, wherein the residence time in the reactor ri, i varying from 1 to n, is between 1 and 60 minutes.

12. A process according to claim 1, wherein the functionalization, coupling or star-branching agent which makes it possible to introduce, into the elastomer, a functional group comprising at least one silicon atom directly connected to the elastomer chain is at least one cyclic polysiloxane corresponding to the formula (I):

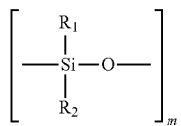 (Formula I)

where m represents an integer with a value ranging from 3 to 8, and $R_1$ and $R_2$, which are identical or different, represent an alkyl radical of 1 to 10 carbon atoms.

13. A process according to claim 1, wherein the functionalization, coupling or star-branching agent which makes it possible to introduce, into the elastomer, a functional group comprising at least one silicon atom directly connected to the elastomer chain is at least one compound corresponding to the formula (II):

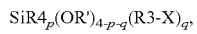 (Formula II)

in which:
R3 is a saturated or unsaturated, cyclic or non-cyclic, divalent $C_1$-$C_{18}$ aliphatic hydrocarbon radical or divalent $C_6$-$C_{18}$ aromatic hydrocarbon radical;
X is a hydrogen atom or a functional group capable of interacting with a reinforcing filler;
the R' radicals, which are substituted or unsubstituted and identical or different, represent a $C_1$-$C_{10}$ alkyl group;
the R4 radicals, which are substituted or unsubstituted and identical or different, represent a $C_1$-$C_{10}$ alkyl group;
p represents an integer with a value ranging from 0 to 2 and q represents an integer with the value 0 or 1, with the proviso that p+q≤2.

14. A process according to claim 13, wherein the functionalization, coupling or star-branching agent does not comprise another functional group than that comprising the silicon atom of alkoxysilane type.

15. A process according to claim 13, wherein the functionalization agent of formula (II) comprises a functional group other than the functional group comprising the silicon atom, capable of interacting with a reinforcing filler, comprising at least one heteroatom chosen from N, S, O or P.

16. A process according to claim 15, wherein the functional group capable of interacting with a reinforcing filler is a protected or unprotected primary amine, a protected or unprotected secondary amine or a tertiary amine which is cyclic or non-cyclic, an isocyanate, an imine, a cyano, a protected or unprotected thiol functional group, a carboxylate, an epoxide or a protected or unprotected primary phosphine, a protected or unprotected secondary phosphine or a tertiary phosphine.

17. A process according to claim 16, wherein the functional group capable of interacting with a reinforcing filler is an amine chosen from (3-N,N-dialkylaminopropyl)trialkoxysilanes, (3-N,N-dialkylaminopropyl)alkyldialkoxysilanes, (3-N,N-alkyltrimethylsilylaminopropyl)trialkoxysilanes, (3-N,N-alkyltrimethylsilylaminopropyl)alkyldialkoxysilanes, (3-N,N-bistrimethylsilylaminopropyl)trialkoxysilanes or (3-N,N-bistrimethylsilylaminopropyl)alkyldialkoxysilanes, the alkyl groups being methyl or ethyl and the alkoxy groups being methoxy or ethoxy.

18. A process according to claim 16, wherein the functional group capable of interacting with a reinforcing filler is a protected or unprotected thiol functional group chosen from (S-trialkylsilylmercaptopropyl)trialkoxysilanes, (S-trialkylsilylmercaptopropyl)alkyldialkoxysilanes, (S-trialkylsilylmercaptoethyl)trialkoxysilanes and (S-trialkylsilylmercaptoethyl)alkyldialkoxysilanes, the alkyl group on the silicon atom bearing the alkoxysilane groups being the methyl or ethyl group, the alkoxy group being the methoxy or ethoxy group and the alkyl group on the silicon bonded to the sulfur atom being the methyl or tert-butyl group.

19. A process according to claim 1, wherein the process further comprises a complementary stage of coupling or star-branching by means of a coupling or star-branching agent based on tin or silicon derivatives of formula $MR_xY_{4-x}$, in which M represents a Sn or Si atom, x represents an integer with a value from 0 to 2, R represents an alkyl radical of 1 to 10 carbon atoms, nd Y is a halogen atom.

* * * * *